US009744481B2

(12) United States Patent
Carrand et al.

(10) Patent No.: US 9,744,481 B2
(45) Date of Patent: Aug. 29, 2017

(54) APPARATUS FOR CLARIFYING A SLUDGE-CONTAINING EFFLUENT

(71) Applicant: Suez Environnement, Paris la Defense (FR)

(72) Inventors: Gilles Carrand, Sartrouville (FR); Chrystelle Langlais, Le Pecq (FR)

(73) Assignee: SUEZ ENVIRONNEMENT (FR)

( * ) Notice: Subject to any disclaimer, the term of this patent is extended or adjusted under 35 U.S.C. 154(b) by 0 days.

(21) Appl. No.: 14/434,871

(22) PCT Filed: Oct. 10, 2013

(86) PCT No.: PCT/IB2013/059265
§ 371 (c)(1),
(2) Date: Apr. 10, 2015

(87) PCT Pub. No.: WO2014/057452
PCT Pub. Date: Apr. 17, 2014

(65) Prior Publication Data
US 2015/0251110 A1 Sep. 10, 2015

(30) Foreign Application Priority Data
Oct. 11, 2012 (FR) ..................................... 12 59695

(51) Int. Cl.
*B01D 21/24* (2006.01)
*B01D 21/30* (2006.01)
(Continued)

(52) U.S. Cl.
CPC ........... *B01D 21/24* (2013.01); *B01D 21/245* (2013.01); *B01D 21/2427* (2013.01);
(Continued)

(58) Field of Classification Search
CPC .............. B01D 21/2427; B01D 21/245; B01D 21/2466; B01D 21/307; B01D 21/34
(Continued)

(56) References Cited

U.S. PATENT DOCUMENTS 2,922,524 A * 1/1960 Rankin ................ B01D 21/245 210/528
3,333,704 A 8/1967 McGivern et al.
(Continued)

FOREIGN PATENT DOCUMENTS

DE 4100309 7/1992
WO 0038975 7/2000

OTHER PUBLICATIONS

Corresponding International Search Report for PCT/IB2013/059265 dated Feb. 24, 2014.

*Primary Examiner* — Christopher Upton
(74) *Attorney, Agent, or Firm* — The Belles Group, P.C.

(57) ABSTRACT

Apparatus for clarifying a sludge-containing effluent, comprising a clarification basin (2), at least one arm (7) able to move over the upper surface of the liquid in the basin; at least one trough (8) supported by the arm so that it can be immersed over part of its height in the liquid of the basin, suction tubes (T1, T2) held relative to the trough, each tube comprising at the top a vertically adjustable sleeve (B1, B2) opening into the trough, and a means of removing sludge from the trough; the sleeve (B1, B2) of at least one suction tube (T1, T2) is free to slide vertically relative to the mobile arm (7) supporting the trough, and to the tube (T1, T2) and a reserve of buoyancy necessary and sufficient for keeping the overspill end (E1, E2) of the sleeve in the trough (8) continuously out of the water is installed on the sleeve (B1, B2) so that the overspill level of the sleeve adjusts automatically in relation to the level (16) of liquid and sludge in the trough.

13 Claims, 2 Drawing Sheets

(51) Int. Cl.
*B01D 21/34* (2006.01)
*C02F 11/00* (2006.01)

(52) U.S. Cl.
CPC ........... *B01D 21/307* (2013.01); *B01D 21/34* (2013.01); *C02F 11/00* (2013.01)

(58) Field of Classification Search
USPC ......................... 210/121, 122, 523, 528, 803
See application file for complete search history.

(56) References Cited

U.S. PATENT DOCUMENTS

| | | | | | |
|---|---|---|---|---|---|
| 3,371,788 | A * | 3/1968 | Smith | B01D 21/245 | 210/528 |
| 3,494,462 | A * | 2/1970 | Baud | B01D 21/245 | 210/528 |
| 3,633,749 | A * | 1/1972 | Panosh | E04H 4/1263 | 210/121 |
| 3,722,698 | A * | 3/1973 | Hampton | B01D 21/24 | 210/528 |
| 3,800,955 | A * | 4/1974 | Edgerton | B01D 21/245 | 210/528 |
| 4,069,150 | A * | 1/1978 | Lodholz | B01D 21/245 | 210/528 |
| 4,142,977 | A * | 3/1979 | Le Fur | B01D 21/2466 | 210/525 |
| 5,830,356 | A * | 11/1998 | Kauppila | B01D 21/2461 | 210/528 |
| 7,790,023 | B1 * | 9/2010 | Mills | B01D 21/2444 | 210/122 |

* cited by examiner

APPARATUS FOR CLARIFYING A SLUDGE-CONTAINING EFFLUENT

PRIORITY

Priority is claimed as a national stage application, under 35 U.S.C. §371, to international patent application No. PCT/IB2013/059265, filed Oct. 10, 2013, which claims priority to French patent application FR1259695, filed Oct. 11, 2012. The disclosures of the aforementioned priority applications are incorporated herein by reference in their entirety.

FIELD OF THE INVENTION

The invention relates to apparatus for clarifying a sludge-containing effluent, of the kind that includes:

- a clarification basin for clarification by settling of sludge that is deposited on the bottom of the basin while clarified water is evacuated at the upper level of the basin;
- at least one arm able to move above the upper level of the liquid in the basin to sweep all the surface of the liquid;
- at least one trough supported by the arm so that it is immersed over part of its height in the liquid in the basin;
- suction tubes held relative to the trough, extending downwardly toward the bottom of the basin, each suction tube including at the top a vertically adjustable sleeve opening into the trough at a level lower than the level of the liquid in the basin, the downwardly extending tubes enabling delivery into the trough of liquid and sludge coming from the bottom of the basin, and
- means for evacuation of sludge from the trough.

The invention more particularly, but not exclusively, concerns apparatus for clarifying an effluent produced by the treatment and purification of waste water in which the sludge is formed mainly by the purifying biomass.

BACKGROUND OF THE INVENTION

Apparatus for clarifying an effluent, known as a clarifier, enables:

- clarification of the effluents,
- separation of the purifying biomass and the most dense particles of the treated effluent by gravity settling,
- thickening, that is to say densification, of this sludge,
- collection and retention of sludge which must be extracted:
  - and recirculated upstream in the treatment line,
  - and/or evacuated to the sludge treatment and/or evacuation line.

The collection and the extraction of the sludge from the bottom of the structure in a limited time is of great economic and technical importance in clarifiers.

In fact, if the extraction of sludge is insufficient and/or unevenly effective over the whole of the surface of the structure, sludge accumulates on the bottom of the structure; portions of this sludge are deprived of oxygen (prolonged anoxia), which causes their physical, mechanical and biological deterioration and as a consequence of this serious disturbances throughout the treatment line, such as:

- deterioration of the quality of the treated water: increased contents of materials in suspension and phosphorus,
- degraded settling of the sludge and therefore the treatment capacity of the clarifier, i.e. its technical/economical effectiveness,
- degraded purification quality of the sludge and therefore the effectiveness of treatment by the whole of the purification line,
- degraded treatability of the sludge, all of which has an economic impact on the treatment cost.

Moreover, the accumulation of sludge on the bottom of the structure leads to high mechanical stresses on the sludge take-up plant and underlying reliability problems in respect of this plant, which:

- reduces the availability of the structures, and
- increases maintenance (labor) costs and plant renewal costs.

A contrario, because the extracted flow of sludge is:

- recirculated to the treatment line, including the clarifier itself, it must be minimized in order to limit:
  - the mass load per unit surface area of the clarifier (kg of dry materials/$m^2 \cdot h$),
  - the sludge extraction plant investment costs (size of extraction and recirculation pumps) and operating costs,
- and/or evacuated to the sludge treatment unit, it must be minimized in order to optimize the sizing and the technical/economic operation of the sludge line.

The efficacy, ruggedness and reliability of the device for taking up sludge from the bottom of the structure are therefore of great importance in sludge extraction:

- necessary to limit the residence time of the sludge in the structure, and
- sufficient not to increase the hydraulic and mass loads on the structures and the treatment plant of the water line and/or the sludge evacuation and treatment line.

The clarification apparatus at which the invention is aimed, also known as "sucked" clarifiers, is well suited to large clarification structures, that is to say to structures in which the basins, in theory circular, have a diameter that is generally greater than 25 m. The suction tubes are immersed directly in the bed of the sludge that has settled on the bottom of the structure and sweep the whole of the bottom surface. These tubes open into the sludge take-up trough on the surface, the hydraulic level of which is kept lower than that of the clarifier.

To enable individual adjustment of the suction rate of each of the tubes, each tube is provided with a fixed but adjustable telescopic sleeve at the overspill level. This sleeve is installed at the outlet of each suction tube and the liquid and the sludge overspill over the upper end of the telescopic sleeve. This difference between the liquid level in the clarifier and the liquid level at the outlet at the top of the sludge overspill telescopic tubes in the trough provides the motive force for the suction and therefore extraction of the sludge. The adjustment of the position of each sleeve must ensure evacuation of the sludge at the bottom of the structure such that there is no accumulation and the bed of sludge has substantially the same thickness over all of the surface of the bottom of the structure.

In the prior art, the level of the upper edge of the sleeves is adjusted by means of chains or threaded rods or notched rods to which the sleeves are attached, the chains or rods being themselves attached to a support.

The adjustment of the levels of each sleeve requires:

- a laborious relatively long iterative manual process of trial and error, taking of the order of one day for a structure having a diameter equal to or greater than 25 m, aiming to measure and to obtain a necessary and sufficient sludge extraction mass flow rate for each of the tubes,
- human intervention and manipulation on a turning bridge generally constituting the mobile arm, with risks of falling in that must be limited for reasons of the safety of the operators and the plant.

The flow rates of sludge to be evacuated are variable, notably in the case of purification station sludge, depending on atmospheric constraints, notably in the event of storms. Under other conditions, however, the flow rate of sludge to be evacuated can be much lower.

In practice, in prior art clarifiers, the levels of the sleeves are adjusted for the highest flow rate to be evacuated. The frequency of adjustment of the levels of the sleeves is limited and in no case is the level of the sleeves adjusted continuously and/or in real time to suit the real requirements of the station.

The liquid level of the sludge in the take-up trough must be maintained:

- below the liquid level in the clarifier to enable extraction of the sludge by the motive force aspirating the sludge caused by the difference in levels; and
- below the outlet levels of the suction tubes, meaning that the tube must necessarily emerge relative to the liquid level in the trough, so as to be able to balance the flow rates through each suction tube in order to obtain a good distribution of the extracted mass flows between the suction tubes; the flow rate through each suction tube is inversely proportional to the viscosity of the fluid conveyed and therefore the sludge concentration.

The differences in hydraulic levels are maintained thanks to permanent external pumping to evacuate sludge from the trough, constituting the means for evacuation of this sludge.

The upper end of the sleeves of the suction tubes should therefore be, at one and the same time:

- continuously sufficiently high to emerge from the liquid level in the trough regardless of the flow rate at which the station is operating, and
- as low as possible relative to the upper hydraulic level in the basin of the clarifier to ensure a maximum flow rate through the suction tubes and to enable extraction of the necessary and sufficient masses of sludge when the station is functioning at its maximum hydraulic and/or mass capacity.

To satisfy these two antagonistic constraints, the outlet level of the sleeves of the suction tubes being in theory adjusted once and for all, and not continuously adjustable, this requires the pumping flow rate in the trough to be permanently as high as possible so that the adjustment of the sleeves of the tubes is correct, that is to say with the sleeves emerging from the water during rain and/or when the station is operating with the maximum flow rate or load.

Depending on these adjustments, and the resulting operation of the apparatus, the sludge extraction and recirculation flow rate is maintained constant and maximum, with no possibility of regulation, irrespective of the real hydraulic conditions under which the station is operating and the real sludge extraction requirements.

Depending on these adjustments, and on the resulting operation, the sludge extraction and recirculation flow rate is, in fact, too high during periods of low hydraulic and/or mass flow rate in the operation of the station (nocturnal periods, periods of dry weather, less polluted effluents leading to lower production of sludge), causing in the water line:

- overconsumption of pumping energy (by a recirculation pump),
- unnecessary wear of the pumping plant with consequences for maintenance costs and plant renewal frequency,
- mass hydraulic overloads on the clarifier that can lead to the entrainment of materials in suspension in the clarified treated water, i.e. deterioration in the quality of the treated water,
- an increased risk of entrainment of air bubbles and therefore of unpriming of the device for evacuating sludge from the trough.

Depending on these adjustments, and the resulting operation, the concentration of the extracted sludge is, in fact, lower than necessary most of the time, and the volumes of sludge to be evacuated and treated are therefore unnecessarily higher than necessary in periods of low hydraulic and mass flow rates in the operation of the station, the consequence of which is to induce in the sludge line:

- overconsumption of pumping energy,
- hydraulic overloads of the sludge line (as a result of degraded operating conditions), and/or
- increased operating times of the treatment unit, increasing electrical power consumption, plant wear and labor costs,
- substantial increases in consumption of reagents,
- possible reduction of the dry content of the treated sludge and therefore the volumes of sludge treated, which leads to an increase in treated sludge handling and evacuation/management costs.

Moreover, in the prior art, despite the usual precautions in respect of the adjustment of the sleeves, the risk of totally immersing some or all of the suction tubes if the level in the take-up trough rises above the overspill level of the sleeves is not controlled in the case of:

- exceptional hydraulic flow rates,
- malfunctioning and/or stopping of the pump for evacuation of sludge from the trough, which can lead to the accumulation of fibrous waste and chaff at the level of the devices for adjustment of each of the telescopic sleeves equipping the suction tubes, with resulting risks in respect of the service life of the plant and the need for time-consuming cleaning operations that are hazardous for personnel and plant.

SUMMARY OF THE INVENTION

The most important object of the present invention is to provide apparatus for clarifying sludge-containing effluent of the type defined above that makes it possible:

- to reduce the sludge extraction flow rate and to improve the control of the residence time of the sludge on the bottom of the structure of a clarifier with suction tubes,
- to reduce in this way the operating costs of the clarifiers, in particular the sludge recirculation pumping costs,
- to reduce the times of operation of the pumping plant and therefore the maintenance and replacement costs for this plant.

More generally, the invention proposes to make more reliable:

- the operation of the clarifiers with suction tubes, and therefore
- the operation of the water and sludge lines of a station for treatment of urban and/or industrial waste water.

In this context, the particular objectives set for the invention are:

- to adapt to the real requirements of the station and in real time the flow rate of extraction of sludge from a clarifier for at least one suction tube, and
- to eliminate the risk of totally immersing at least one suction tube.

To this end, in accordance with the invention, apparatus for clarifying a sludge-containing effluent of the kind defined above is characterized in that the sleeve of at least one suction tube is free to slide vertically relative to the mobile arm supporting the trough and to the tube and in that the sleeve has a reserve of buoyancy necessary and sufficient for keeping the overspill end of the sleeve in the trough continuously out of the water so that the overspill level of the sleeve adapts automatically relative to the level of the liquid and sludge in the trough.

Each suction tube is preferably equipped with a sleeve free to slide vertically relative to the mobile arm and to the tube and each sleeve preferably has a reserve of buoyancy necessary and sufficient for keeping the overspill end of the sleeve in the trough continuously out of the water.

Each sleeve may be made from a material the density of which is higher than that of the liquid in the trough and to provide the reserve of buoyancy the sleeve includes a floating device that is immersed in the liquid in the trough and that holds the upper edge of the sleeve at a constant distance above the liquid level in the trough. The sleeves and the suction tubes may be made of polyvinyl chloride.

The floating device may consist of a float that surrounds the corresponding sleeve. The float may have the shape of a ring or a torus. Each float may be made of expanded polystyrene.

The floating device is advantageously adjustably mounted on the sleeve so that its position is adjustable in the heightwise direction.

The various floating devices equipping the suction tubes of the same clarifier may differ in terms of size and/or the density of the materials so that the positions of the overspill ends of each of the sleeves can vary from one tube to another and thus enable individual adjustment of the aspiration capacity of each suction tube.

The apparatus may include a vertical guide device for the movement of each sleeve free to slide vertically relative to the mobile support arm.

The apparatus advantageously includes a vertical guide device for the movement of each sleeve free to slide vertically relative to the mobile support arm. The guide device may include a flat part similar to a ladder the lower portion of which is forceps-shaped with two branches that engage in diametrically opposite holes at the upper end of the sleeve, the vertical plane of the part being oriented at a right angle to the radial direction of the arm and the trough, guide plates fixed to the arm including a slot through which the part passes vertically and which guides it. The slot may be equipped with a shoe made from a material having a low coefficient of friction.

Alternatively, each sleeve may be made from a material the apparent density of which is less than that of the liquid in the trough and the basin and is equipped with an adjustable ballast weighing on the guide system, notably a guide rod, for the adjustment of the position of the upper overspill end of the sleeve in the trough.

The floating device providing the reserve of buoyancy is optimized to facilitate the free vertical movement of the sleeve and not to disturb the horizontal flow of sludge evacuated from the trough.

BRIEF DESCRIPTION OF THE DRAWINGS

Apart from the features explained above, the invention consists in a certain number of other features described more explicitly hereinafter with reference to the appended drawings, which are in no way limiting on the invention. In these drawings.

DETAILED DESCRIPTION OF THE INVENTION

Figure 1:
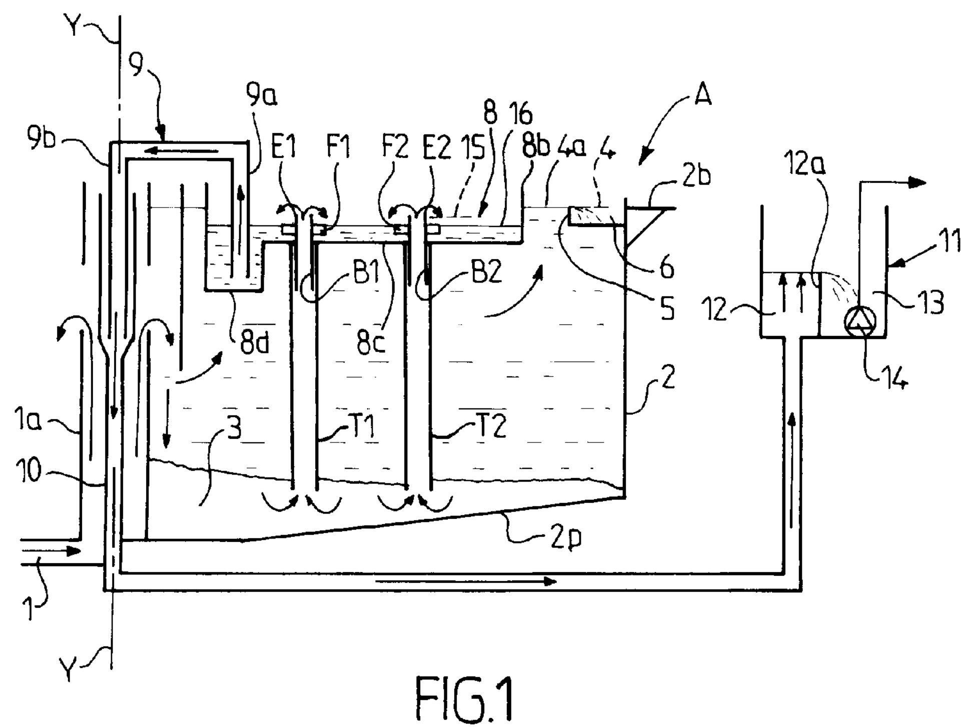
FIG. 1 is a partial diagrammatic vertical section of clarification apparatus in accordance with the invention, the mobile arm not being represented.

Referring to FIG. 1 of the drawings, there can be seen apparatus A for clarifying effluent 1 which in the embodiment represented arrives via a pipe in the lower part of the apparatus A, which includes a clarification basin 2. The basin 2 is generally circular and its diameter is at least 20 m for the kind of clarifier to which the invention more particularly relates. Only half of the basin 2 is represented in FIG. 1, the other half being symmetrical with respect to the vertical geometrical axis Y-Y of the circular basin.

Sludge is deposited on the bottom of the basin to form a layer 3 and clarified water 4 is evacuated at the upper level of the apparatus over an overspill weir 5 and is collected in a gully 6 to be recovered by means that are not represented. In accordance with the FIG. 1 embodiment, the bottom **2*p* of the basin 2** has a more or less pronounced slope or is horizontal.

Figure 2:
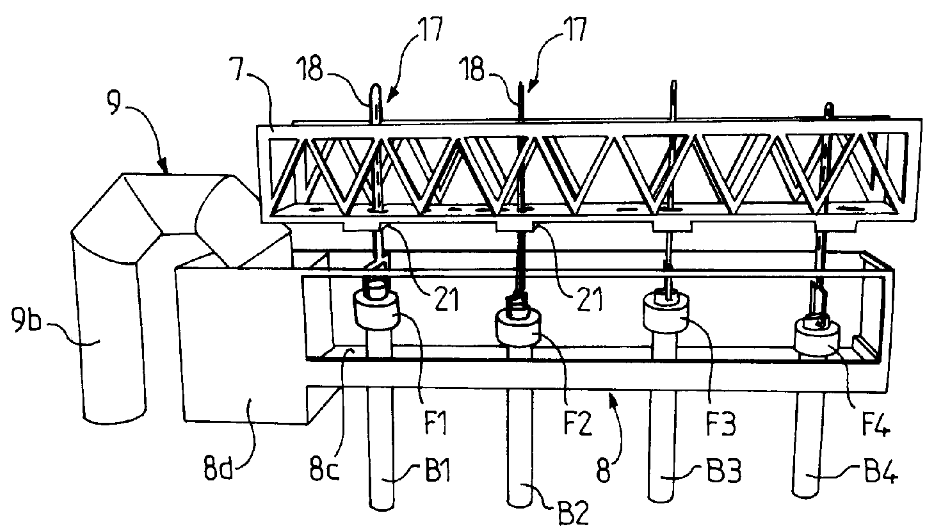
FIG. 2 is a perspective view, with parts removed, of a trough with four sleeves below a mobile arm of clarification apparatus in accordance with the invention.

The apparatus A includes at least one mobile arm 7 that can be seen in FIG. 2 but is not represented in FIG. 1. The arm 7 extends radially from the central area of the basin 2 where it is supported and driven in rotation by a central or peripheral motor (not represented). The radially outermost end of the arm 7 is supported by a support leg, not represented, provided in its lower part with a rolling member resting on a rolling track **2*b* integral with the cylindrical wall of the basin 2, optionally projecting radially outward. The arm 7 constitutes a turning bridge, represented diagrammatically, which enables sweeping of all the surface of the liquid in the basin 2 by a 360° rotation. The arm 7** is designed to allow an operator to move safely on the arm to carry out the necessary adjustments of the apparatus.

Although clarification basins are generally circular, the invention applies equally to rectangular basins surmounted by an arm mobile in translation along one dimension of the basin, notably the length.

At least one trough 8 is supported by the arm 7, for example with the aid of tie-rods that are not represented, so that it is immersed over a portion of its height in the liquid in the basin 2. The trough 8 has a substantially rectangular cross section open at the top and closed on all its other sides. In FIG. 2, a longitudinal wall of the trough is opened up to expose the interior of the trough. The upper edge **8*b* of the wall of the trough is above the upper level 4*a* of the clarified water, that is to say above the upper level of the liquid in the basin 2**.

The bottom **8*c* of the trough is substantially horizontal from the radially outermost end to a well 8*d* provided at the radially innermost end of the trough 8. A vertical branch 9*a*** of a siphon 9 dips into the well 8*d* and the other vertical branch 9*b* of the siphon constitutes a mobile hydraulic seal. A vertical pipe 10 is connected to the hydraulic seal for the evacuation of sludge taken up from the bottom of the well 8*d* via the siphon 9. The maximum motive head because of the difference in liquid level for the evacuation of sludge in the pipe 10 is equal to the head difference between the upper level 4*a* of the clarified water in the basin and the outlet level of the suction tubes above the level in the trough.

The pipe 10 is connected to a sludge take-up ditch 11. The ditch 11 is divided into two compartments 12, 13 by a partition 12*a* forming an overspill weir. The sludge arrives in the compartment 12 and the pump 14 is in the other compartment 13 into which the sludge overspills. The pump 14 constitutes means for evacuation of the sludge to an aeration basin that is not represented. The flow rate of the pump 14 is regulated. The feed pipe 1 for effluent to be treated is connected to a cylindrical vertical part 1*a* around the pipe 10.

Suction tubes T1, T2 are secured to the underside of the trough 8 and extend downwardly toward the bottom of the basin 2 so that their lower end enters the bed 3 of sludge. The tubes T1, T2 are at different radial distances from the geometrical axis Y-Y and there is a sufficient number of them to ensure satisfactory evacuation of the deposited sludge. In accordance with the embodiment represented in FIG. 1, for simplicity, only two tubes T1, T2 have been represented, but the number of tubes may be greater than this and as high as 20 or more. The tubes T1, T2 may be fixed under the bottom 8*c* of the trough, which includes orifices in line with the tubes T1, T2.

Each tube T1, T2 includes in its upper part a sleeve B1, B2 that opens into the trough 8 at a level 15 lower than the level 4*a* of the liquid in the basin. The difference between the liquid level 4*a* in the clarifier and the level 15 at which sludge overspills into the trough at the outlet from the sleeves provides the motive force for suction and extraction of the sludge from the bottom of the clarifier 2. The sleeves B1, B2 are of cylindrical tubular shape and are engaged inside the tubes T1, T2.

In accordance with the invention, for at least one suction tube, and preferably for each suction tube, the sleeve B1, B2 is free to slide vertically relative to the associated tube and the mobile arm 7. The vertical sliding movement between the sleeve B1, B2 and the associated tube T1, T2 is almost completely sealed by means of appropriate seals.

Each sleeve B1, B2 has a reserve of buoyancy necessary and sufficient to maintain the upper, overspill end E1, E2 of the sleeve continuously above the water in the trough. The overspill level of the sleeve is automatically adjusted relative to the level 16 of the liquid and the sludge in the trough 8.

Figure 3:
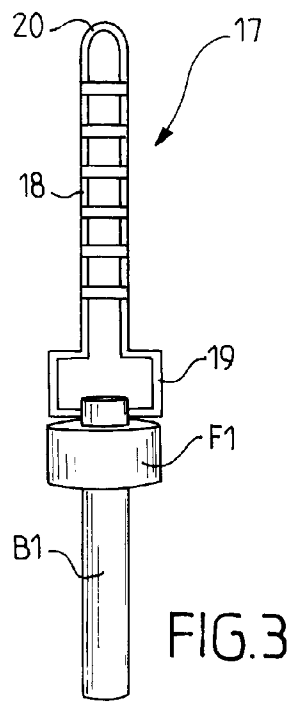
FIG. 3 shows in elevation a sleeve provided with its float and vertical guide means.
Figure 4:
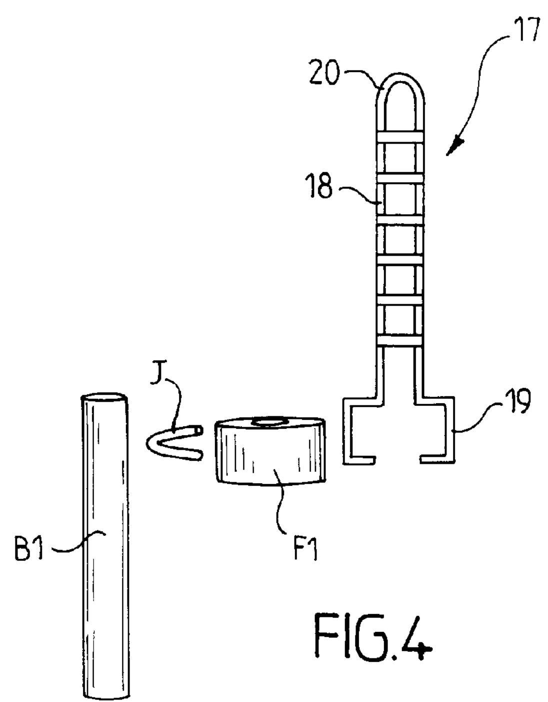
FIG. 4 is an exploded view in elevation of the elements from FIG. 3.

To provide this reserve of buoyancy, the sleeve B1, B2 is advantageously provided with a floating device consisting of a float F1, F2 that is immersed in the liquid in the trough 8 and maintains the upper edge of the sleeve at a constant distance above the level 16 of liquid in the trough. As can be seen in FIGS. 2 to 4, the floats can have a ring or torus shape to surround the corresponding sleeve B1, B2.

Each float is mounted on the sleeve so as to be adjustable in the vertical direction, in particular by screwing it relative to said sleeve, by means of a helicoidal open clamping ring J fastened to the sleeve (FIG. 4) so that its position is easily adjustable in the heightwise direction.

The floats F1, F2 may be made from expanded polystyrene or some other material of lower density than the liquid in the trough 8. With such a float, the corresponding sleeve may be made from a material the density of which is higher than that of the liquid in the trough. The sleeves B1, B2 and the tubes T1, T2 are advantageously made of polyvinyl chloride (PVC).

Alternatively, each sleeve may be produced with an apparent density lower than that of the liquid in the trough and the basin, in which case the reserve of buoyancy is inherent to the sleeve itself. For the adjustment of the position of the upper overspill end of the sleeve in the trough, there is then provided an adjustable ballast acting on the sleeve to weigh on the mobile guidance system, notably a guide rod. In accordance with this variant the inherent density of the material of the sleeve may be either less than that of the liquid or greater than the latter, in which case closed voids are provided in the material to reduce the apparent density.

The various floating devices, or floats F1, F2, equipping the suction tubes T1, T2 of the same clarifier may differ in terms of size and/or the density of the material used so that the overspill ends E1, E2 of each of the sleeves can vary from one tube to another and therefore allow individual adjustment of the aspiration capacity of each suction tube.

As shown in FIGS. 2 to 4, each sleeve such as B1 is equipped with a vertical guide device 17 adapted to retain the sleeve B1 along its vertical geometrical axis of movement within the suction tube T1 fixed relative to the trough 8 and the arm 7.

Figure 5:
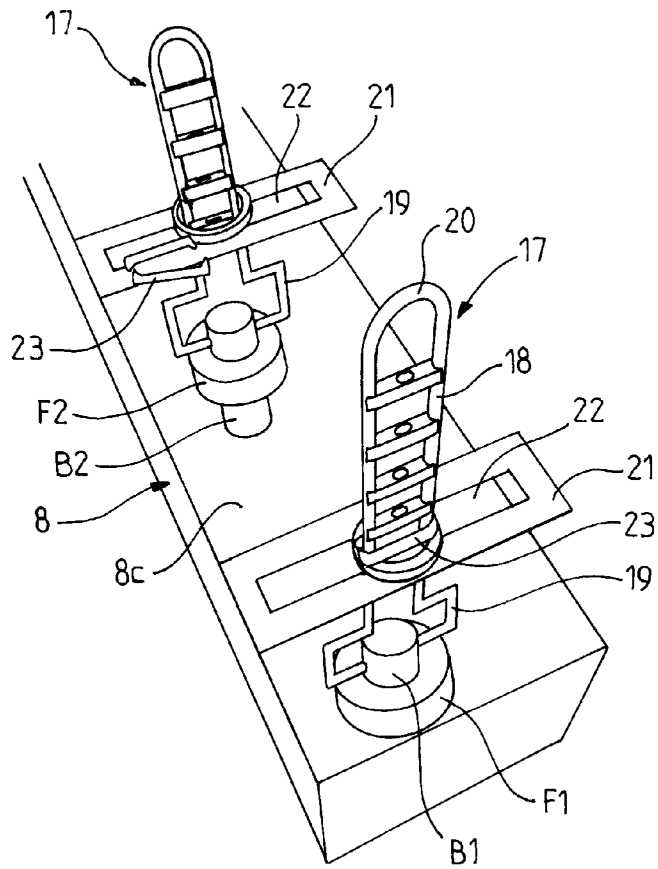
FIG. 5 is a diagrammatic perspective view from above of part of the trough and the sleeves of clarification apparatus in accordance with the invention.

In accordance with the embodiment of FIGS. 2 to 4, the guide device 17 includes a flat part 18 similar to a ladder, the lower portion 19 of which is forceps-shaped with two branches that engage in diametrically opposite holes at the top end of the sleeve B1. The upper end 20 of the part 18 is of closed semicircular shape to constitute a handle facilitating grasping of the part 18 for vertical movement. The vertical plane of the part 18 is oriented at a right angle relative to the radial direction of the arm 7 and the trough 8. Guide plates 21 (FIGS. 2 and 5) fixed under the arms 7 include a slot 22 orthogonal to the radial direction. The part 18 passes vertically through this slot 22, which guides it. The slot 22 is advantageously equipped with a shoe 23 made from a material with a low coefficient of friction, notably polytetrafluoroethylene (PTFE), making it possible to limit the risk of abrasion and to render the device long-lasting. The shoes 23 may be made from any material identified for its properties of low friction and mechanical strength.

This being the case, the adjustment and the operation of clarifying apparatus in accordance with the invention are as follows.

For any flow rate of effluent to be treated arriving via the pipe 1 and to which there corresponds a level 16 in the trough 8 and a bed 3 of sludge, the operator adjusts the position of the sleeves B1, B2 by adjusting the position of the floats F1, F2. For each sleeve, this adjustment is effected so that the upper overspill end E1, E2 of the sleeve is at an appropriate level, lower than the level 4*a*, of course, to ensure a satisfactory flow rate of evacuation of the sludge via the corresponding tube T1, T2.

When this adjustment has been carried out, a variation in the height of the level 16 leads to a corresponding variation in the height of the upper ends E1, E2, which therefore remain at a constant distance above the level 16, so that there is no other adjustment to be carried out when the level in the trough 8 varies.

In accordance with the invention, the overspill level of the suction tubes and the sleeves therefore depends on the level of sludge in the trough 8 and consequently becomes intrinsically linked to the flow rate of evacuation of sludge from the trough. As a result of this the flow rate of evacuation of sludge from the trough 8, already controlled and/or being easily controllable in real time according to the real requirements of the station, enables optimum control in real time of the flow rate of extraction of sludge from the clarifier with no automation additional to that already existing and without human intervention.

Moreover, the present invention advantageously eliminates all risk of totally immersing the suction tubes T1, T2 and the sleeves B1, B2 the overspill end of which remains above the level 16 of liquid in the trough 8 by virtue of their buoyancy.

In contrast to this, in a conventional clarifier not using the invention, the sleeves would be fixed relative to the arm 7. When an adjustment of the position of the upper end has been carried out, this position relative to the arm 7 and to the bottom of the trough 8 remains fixed. If the level 16 of liquid in the trough varies, the distance between the overspill end of the sleeve and the liquid level in the trough varies, whereas in accordance with the invention this distance remains constant and enables self-regulation of the level 16 of liquid in the trough 8. In fact, in accordance with the invention, if the level 16 falls, the overspill end of the sleeve also falls, which increases the motive hydraulic head and increases the flow rate of sludge aspirated via the suction tube T1, T2 to cause the liquid level in the trough 8 to rise. Conversely, if the level in the trough 8 rises, the overspill end of the sleeves also rises, which reduces the motive hydraulic force.

The means proposed by the invention are:

simple, rugged, of relatively low cost to purchase, very easy to fit to an existing clarifier.

They do not necessitate any modification of civil engineering structures and/or plant that would impact on the warranties of the structures. They do not lead to additional maintenance costs. They require little if any modification of existing automatic control and regulation systems in treatment stations.

The invention claimed is:

1. An apparatus for clarifying a sludge-containing effluent, comprising:

a clarification basin for clarification by settling of sludge that is deposited on the bottom of the basin while clarified water is evacuated at the upper level of the basin;

at least one arm able to move above the upper level of the liquid in the basin to sweep all the surface of the liquid;

at least one trough supported by the arm, so that it is immersed over part of its height in the liquid in the basin;

suction tubes held relative to the trough, extending downwardly toward the bottom of the basin, each suction tube including at the top a vertically adjustable sleeve opening into the trough at a level lower than the level of the liquid in the basin, the downwardly extending tubes enabling delivery into the trough of liquid and sludge coming from the bottom of the basin, and means for evacuation of sludge from the trough, wherein the sleeve of at least one suction tube is free to slide vertically relative to the mobile arm supporting the trough and to the tube and in that the sleeve has a reserve of buoyancy necessary and sufficient for keeping the overspill end of the sleeve in the trough continuously out of the water so that the overspill level of the sleeve adapts automatically relative to the level of the liquid and sludge in the trough.

2. The apparatus as claimed in claim 1, wherein each suction tube is equipped with a sleeve free to slide vertically relative to the mobile arm and to the tube and in that each sleeve has a reserve of buoyancy necessary and sufficient for keeping the overspill end of the sleeve in the trough continuously out of the water.

3. The apparatus as claimed in claim 1, wherein each sleeve is made from a material the density of which is higher than that of the liquid in the trough and that to provide the reserve of buoyancy the sleeve includes a floating device that is immersed in the liquid in the trough and that holds the upper edge of the sleeve at a constant distance above the liquid level in the trough.

4. The apparatus as claimed in claim 3, wherein the sleeves and the suction tubes are made of polyvinyl chloride.

5. The apparatus as claimed in claim 3, wherein the floating device consists of a float that surrounds the corresponding sleeve.

6. The apparatus as claimed in claim 5, wherein the float has the shape of a ring or a torus.

7. The apparatus as claimed in claim 5, wherein each float is made of expanded polystyrene.

8. The apparatus as claimed in claim 3, wherein the floating device is adjustably mounted on the sleeve so that its position is adjustable in the heightwise direction.

9. The apparatus as claimed in claim 3, wherein the various floating devices equipping the sleeves of the same clarifier differ in terms of size and/or the density of the materials so that the positions of the overspill ends of each of the sleeves can vary from one tube to another and thus enable individual adjustment of the aspiration capacity of each suction tube.

10. The apparatus as claimed in claim 1, further comprising a vertical guide device for the movement of each sleeve free to slide vertically relative to the mobile support arm.

11. The apparatus as claimed in claim 10, wherein each sleeve is made from a material the apparent density of which is less than that of the liquid in the trough and the basin and is equipped with an adjustable ballast weighing on the guide device for the adjustment of the position of the upper overspill end of the sleeve in the trough.

12. The apparatus as claimed in claim 10, wherein the guide device includes a flat part having a shape similar to the shape of a ladder, the lower portion of which is forceps-shaped with two branches that engage in diametrically opposite holes at the upper end of the sleeve, the vertical plane of the part being oriented at a right angle to the radial direction of the arm and the trough, guide plates fixed to the arm including a slot through which the part passes vertically and which guides it.

13. The apparatus as claimed in claim 12, wherein the slot is equipped with a shoe made from a material having a low coefficient of friction.

* * * * *